Dec. 5, 1967      F. GLÖTZL      3,355,936
APPARATUS FOR MEASURING MECHANICAL STRESSES
AND HYDRAULIC PRESSURES
Filed Aug. 9, 1965

United States Patent Office 3,355,936
Patented Dec. 5, 1967

3,355,936
APPARATUS FOR MEASURING MECHANICAL
STRESSES AND HYDRAULIC PRESSURES
Franz Glötzl, Karlsruhe-Rupurr, Germany (11 Forlenweg,
D-7501 Forchheim-Bahnhof, Germany)
Filed Aug. 9, 1965, Ser. No. 478,286
5 Claims. (Cl. 73—88.5)

The present invention relates to an apparatus for measuring mechanical stresses and hydraulic pressures.

The most successful method which is presently known for carrying out static measurements is the so-called compensating method in which a pressure cell is subjected to external soil or hydraulic pressures and is supplied with a hydraulic or pneumatic internal back pressure of a strength so as to be equal to the external pressures and thus to compensate the same. By measuring the strength of these internal pressures, it is then possible to determine the external pressures which act upon the pressure cell. The different compensating methods and apparatus which have heretofore been developed possess, however, various disadvantages which may result in faulty measurements or even in the destruction of the pressure cell. Thus, for example, those pressure cells, in which a pressure-relief valve is controlled by the pressure which is to be measured, have the disadvantage that, when such an apparatus is being removed from one place of installation in order to be installed at another place, dirt particles may enter therein which may interfere with the proper operation of the valve. Similar effects may occur in those types of apparatus which are provided with electrical contact means for indicating when the particular compensating pressure is reached. The entry of dirt or moisture and fouling of its electrical contacts may also render this apparatus entirely inoperative.

Although the U.S. Patent No. 2,683,989 discloses an apparatus, called a pressure pickup device, in which the pressure compensation does not require any valves or electrical contacts, this apparatus has a series of disadvantages, at least some of which should here be mentioned. It requires a relatively thick resilient diaphragm which serves as an armature between two sets of inductance coils and is therefore movable in opposite directions from its neutral or compensating position. Since this neutral position of the diaphragm is not mechanically fixed but determined by the electrical values of the inductance coils and the long electrical lines leading thereto, it is impossible to carry out accurate measurements since these values cannot be accurately controlled or readjusted after the pressure cell has once been installed. Because of its thickness, this diaphragm is rather insensitive, it must be moved for considerable distances, which, in turn, means large air graps, and it also requires considerable changes in pressure to effect such movements. This fact and especially also its low sensitivity renders this diaphragm unsuitable for certain measurements, for example, for measuring the stresses in concrete. Furthermore, it must be made of such a thickness and strength that it will bear the entire pressure to which it is subjected. This, in turn means that, if an excess pressure occurs, the diaphragm may be permanently deformed or even break so that the entire apparatus must be replaced.

It is an object of the present invention to provide an apparatus for measuring mechanical stresses and hydraulic pressures which not only overcomes all of the above-mentioned disadvantages of similar apparatus as were heretofore known, but also possesses certain very important advantages over these prior apparatus.

Similar to the apparatus as disclosed in the above-mentioned patent, the apparatus according to the invention likewise comprises a pressure cell which is provided with a diaphragm of a magnetically conductive material which is inductively associated with a magnetic circuit, the reluctance of which is varied by the movements of the diaphragm relative to the pole pieces of this circuit as the result of differences in pressures applied upon the opposite sides of the diaphragm.

One important feature of the invention is that the diaphragm is very thin and elastic and therefore very easily movable by small changes in pressure.

Another important feature of the invention, also in combination with the last-mentioned feature insofar as it permits the employment of such a thin elastic diaphragm, consists in the particular structure of the electromagnet which is mounted at one side of the diaphragm within the housing thereof and comprises a large number of closely adjacent pole pieces of alternating polarity which are separated from each other by recesses in which the windings of the magnetic coil are mounted. These pole pieces and intermediate parts containing the coil windings form a substantially level surface on which the diaphragm is supported as long as the internal hydraulic or pneumatic pressure which is supplied to the inner side of the diaphragm does not exceed the external pressure which is to be measured. However, as soon as the internal pressure exceeds the external pressure, the thin diaphragm will separate from the pole pieces and a very narrow air gap will thus be formed as the result of which the reluctance in the magnetic circuit will change which will be immediately indicated on an instrument which then shows that the pressure which is supplied to the diaphragm housing and is indicated on a pressure gauge corresponds to the pressure which is exerted upon the outer side of the diaphragm. The division of the electromagnet into a large number of pole pieces serves not only so as to form a solid support for the diaphragm which may be regarded as being practically continuous, but its still more important purpose is that in this manner very short magnetic lines of force are produced, and that the density of these lines of force per unit area of the diaphragm will be very low which, in turn, permits the diaphragm to be made very thin and thus very sensitive to the internal pressure when slightly exceeding the external pressure.

Another feature of the invention consists in the fact that, even though the multiple pole pieces form a substantially flat supporting surface upon which the diaphragm will directly engage, there is no need to provide any special chamber or channels between the diaphragm and the pole pieces and coil windings since the surface roughness of these pole pieces and the inner side of the diaphragm provides sufficient room through which the hydraulic or pneumatic pressure will be quickly distributed so as to act upon the diaphragm. However, according to an additional feature of the invention, the recesses in which the coil windings are embedded within an insulating material are preferably filled only to such an extent that shallow grooves will remain between the upper surfaces of the insulating material and the inner surface of the diaphragm. These shallow grooves together with the surface roughness of the diaphragm and pole pieces insure that the internal pressure will be quickly transmitted to all points of the inner surface of the diaphragm.

These and numerous other features and advantages of the present invention will become further apparent from the following detailed description thereof which is to be read with reference to the accompanying drawings, in which FIGURE 1 shows a cross section of a pressure cell according to the invention;

FIGURE 5 shows a circuit diagram of the entire measuring system; while

Figure 1:
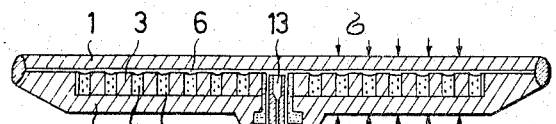
Figure 4:
FIGURE 4 shows a cross section of the pressure supply conduit which is connected to the pressure cell according to FIGURE 1.
Figure 3:
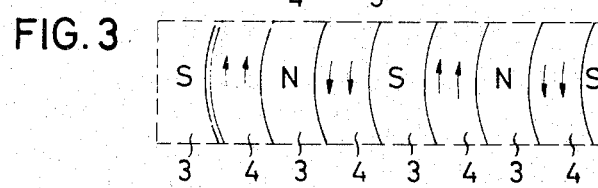
FIGURE 3 shows a top view of the pole pieces and intermediate recesses containing the coil windings, as seen in the direction of the arrows in FIGURE 2.
Figure 5:
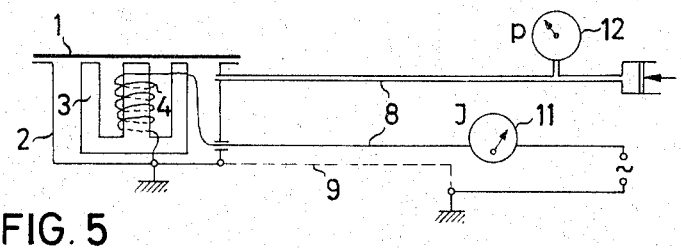

As illustrated in the drawings, the pressure cell according to the invention consists of a housing in which a very thin diaphragm 1 of a magnetically conductive material is secured along its peripheral edge. This diaphragm which is shown in FIGURE 1 of a much greater thickness than it would actually have in relation to the other elements preferably consists of an elastic material of a very low rigidity which may even consist of a metallized or metal-coated sheet of plastic. In its normal position, this diaphragm 1 rests on a supporting body 2 which is provided on its upper side with recesses between which pole pieces 3 are formed, the upper surfaces of which support the diaphragm 1 as long as the internal pressure which is supplied to the pressure cell does not exceed the external pressure which acts upon the outer surface of the diaphragm. The pole pieces 3 may, however, form separate inserts in the diaphragm housing. These recesses in the support 2 contain coil windings 4 which are wound so that, as indicated in FIGURE 3, the adjacent pole pieces 3 differ in polarity. The coil windings 4 are embedded in an insulating material 5, the upper surfaces of which are disposed at such a level that shallow grooves 6 remain between them and the level of the pole pieces 3. These grooves 6 together with the normal surface roughness of the inner surface 7 of diaphragm 1 provide a sufficient space within which the hydraulic or pneumatic pressure may act upon the diaphragm even though the latter directly engages upon the pole pieces 3.

Centrally on its lower side, the supporting body 2 is provided with a tubular member into which a metal tube 8 of good electric conductivity is inserted which forms the pressure supply line to the grooves 6 and to the area between these grooves and also the electric connection to one end of the coil winding 4. The other end of this winding is connected to the metallic supporting body 2 from which the current is conducted through an outer metallic jacket 9 around the metal tube 8 to an electrical measuring instrument 11 which may be located at a place remote from the location of the pressure cell. The metal tube 8 is electrically insulated from the metallic jacket 9 by an intermediate insulating layer 10.

The process of carrying out the desired measurements is as follows:

After the pressure cell according to the invention has been installed in the material, the pressures or stresses of which are to be measured, a hydraulic or pneumatic pressure medium is supplied through the supply line 8 to the inside of the pressure cell so as to build up a pressure therein which is continuously indicated by a pressure gauge 12. This is continued until a definite deflection occurs in the electrical instrument 11 which indicates that the internal pressure $p$ within the pressure cell has been built up sufficiently so that it just starts to exceed the external pressure $\sigma$ which acts upon the outer side of the diaphragm 1, and that therefore the diaphragm 1 starts to disengage from the pole pieces 3 and a small air gap is formed so that the reluctance of the magnetic circuit which is formed by the coil windings 4 is changed. When this occurs, the pressure gauge 12 indicates a pressure which slightly exceeds the external pressure $\sigma$. This external pressure can thus be measured very accurately since the diaphragm 1 is so thin and sensitive that it will react immediately as soon as the internal pressure equals the external pressure and just starts to exceed the same.

Since prior to the measuring process the diaphragm 1 rests directly upon the pole pieces 3 and the reluctance of the magnetic circuit is originally adjusted in accordance with this position of the diaphragm so that there is practically no air gap, and since the measuring process therefore proceeds from an air gap of zero rather than from one of a considerable size as it occurs in similar apparatus as disclosed by the prior art, the sensitivity of the pressure cell according to the invention is many times as high as that of the known apparatus. This not only permits much more accurate measurement, for example, of a soil pressure, to be made than were previously possible, but it is now also possible to measure the stresses in building materials with a high modulus of elasticity, for example, concrete, without requiring the use of an additional pressure cushion which is necessary in pressure cells in which the diaphragm must move for considerable distances and which, in turn, results in faulty measurements because of the differences in expansion of the pressure cushion due to changes in temperature of the material to be tested.

The pressure cell according to the invention also has the advantage, especially over pressure cells employing valves or electrical contacts, that interferences which are due to the concentration of a load upon certain points of the diaphragm surface, especially near the center thereof, will be largely compensated since the total value of a change in reluctance in the magnetic circuit is measured as a mean value.

Furthermore, the new pressure cell also permits dynamic measurements of a very small amplitude to be carried out by supplying the cell with an internal pressure which exceeds the external pressure to such an extent that the diaphragm 1 will be lifted off and slightly spaced from its support which is formed by the pole pieces 3. Consequently, the electrical instrument 11 will then also indicate a higher value. If subsequently the external load changes, this difference from the previous load will be born almost entirely by the thin diaphragm since it is then supported merely on its peripheral edge, so that very small changes in load will result in considerable movements of the diaphragm and thus in considerable changes in indication. Due to the fact that the zero position of the diaphragm when it is in engagement with the pole pieces 3 may at all times be accurately determined, it is possible to calibrate the apparatus statically for the subsequent changes in the dynamic load whenever desired, and even after the pressure cell has been installed.

For very high frequencies of oscillation it is also possible to carry out measurements of greater load amplitudes at the same sensitivity and accuracy as in static measurements by providing the end of the pressure supply line within the pressure cell with a throttling member 13. Although such a throttling member permits slow changes in pressure to be measured in the manner as previously described, it also permits changes in stresses of high amplitudes which only last for short periods of time to be measured by means of the diaphragm which is then elastically supported by the pressure medium between the lifted diaphragm and the pole pieces. The extent of yielding of the diaphragm and the corresponding indication on the electrical instrument 11 then depends upon the compressibility of the pressure medium which is enclosed within the chamber which is then formed between the lifted diaphragm, the groove 6, and the throttling member 13.

Figure 6:
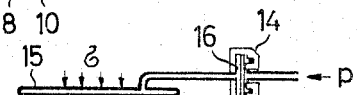
FIGURE 6 shows diagrammatically a pressure cell according to the invention which is connected to a pressure cushion.
Figure 2:
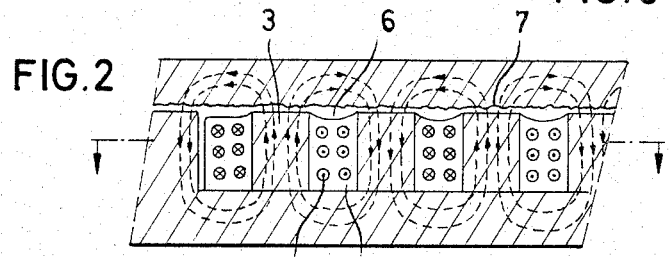
FIGURE 2 shows a very enlarged cross section of a part of the pressure cell according to FIGURE 1.

If, as illustrated in FIGURE 6, a pressure cushion 15 is connected to a pressure cell 14 so as to serve as a converter, for example, of the mechanical stresses of concrete or a soil pressure into a fluid pressure, the invention also permits the extent of the movement of the diaphragm from its support i.e. from the pole pieces 3 to be limited by means of a stop surface 16 so that the following result will then be attained:

The internal measuring pressure within the supply line 8 and the pressure cell may now exceed the external pressure $\sigma$, that is, the pressure to be measured, to any desired extent. If a plurality of pressure cells together with their associated pressure cushions are embedded, for example, in a dam, the electrical lines must be layed separately to the individual pressure cells, while a single pressure line may lead to all of the cells. For carrying out a measurement by means of one particular pressure cell, it is then only necessary to connect this cell electrically to the circuit of the electrical instrument 11. In accordance with the particular indication of this instrument, the pressure in the common pressure line is then either increased or reduced until the desired reading is attained. The costs of a larger installation and also the length of time required for carrying out a series of measurements may thus be considerably reduced.

The present invention also permits the new pressure cell to be employed for ascertaining the temperature which prevails at the place of its installation. This may simply be done by making the coil winding 4 of a temperature-responsive wire and by employing the measuring instrument to carry out a direct-current measurement.

Finally, it is possible to combine the functions of the two instruments 11 and 12 so as to be dependent upon each other so that the pressure pump will be automatically stopped when the electric instrument 11 indicates that a pressure balance between the internal and external pressure is reached or when it indicates a certain desired value.

Although my invention has been illustrated and described with reference to the preferred embodiments thereof, I wish to have it understood that it is in no way limited to the details of such embodiments but is capable of numerous modifications within the scope of the appended claims.

Having thus fully disclosed my invention, what I claim is:

1. A pressure cell for measuring mechanical stresses and hydraulic pressures comprising a housing, a thin diaphragm of a magnetically conductive material secured adjacent to its peripheral edge within said housing and having outer and inner sides, said outer side being adapted to be acted upon by an external pressure to be measured, an electromagnet adapted to be connected to an electric circuit and having a large plurality of pole pieces of alternating polarity closely adjacent to each other and facing the inner side of said diaphragm, means for connecting said housing to a pressure line for supplying a pressure medium into said housing so as to build up an internal pressure on the inner side of said diaphragm, said pole pieces engaging with and supporting said diaphragm until said internal pressure has been built up to a strength equal to the strength of said external pressure, said diaphragm being adapted to separate from said pole pieces as soon as said internal pressure slightly exceeds said external pressure, whereby the reluctance of said circuit is changed.

2. An apparatus for measuring mechanical stresses and hydraulic pressures comprising at least one pressure cell having a housing, a thin diaphragm of a magnetically conductive material mounted adjacent to its peripheral edge within said housing and having outer and inner sides, said outer side being adapted to be acted upon by an external pressure to be measured, an electromagnet having a plurality of pole pieces of alternating polarity closely adjacent to each other and facing the inner side of said diaphragm, an electric circuit connected to said electromagnet so as to form a magnetic circuit, an electric measuring instrument connected into said circuit, means for supplying a pressure medium to the inside of said housing so as to build up an internal pressure on the inner side of said diaphragm, a pressure gauge connected to said pressure supply means for indicating the strength of said internal pressure, said pole pieces engaging with and supporting said diaphragm until said internal pressure has been built up to a strength equal to the strength of said external pressure, said diaphragm being adapted to separate from said pole pieces as soon as said internal pressure slightly exceeds said external pressure whereby the reluctance of said magnetic circuit is changed and said change is indicated by said measuring instrument.

3. A pressure cell as defined in claim 1, further comprising means for limiting the distance of movement of said diaphragm away from said pole pieces independently of the strength of said internal pressure.

4. An apparatus as defined in claim 2, in which a plurality of said pressure cells are provided, each of said pressure cells having means for limiting the distance of movement of said diaphragm away from said pole pieces independently of the strength of said internal pressure, a pressure cushion connected to the outer side of said diaphragm of each pressure cell, and a common pressure line connected to all of said pressure cells.

5. A pressure cell as defined in claim 1, in which the windings of said electromagnet consist of a temperature-responsive resistance wire.

References Cited

UNITED STATES PATENTS

| 2,284,707 | 6/1942 | Wilson | 73—84 |
| 2,645,128 | 7/1953 | Walker et al. | 73—388 |

FOREIGN PATENTS

| 704,248 | 2/1954 | Great Britain. |

OTHER REFERENCES

Seaquist: Engineering News-Record, June 7, 1934, pp. 730–732, copy in 73–84.

RICHARD C. QUEISSER, *Primary Examiner.*

C. A. RUEHL, *Assistant Examiner.*